UNITED STATES PATENT OFFICE.

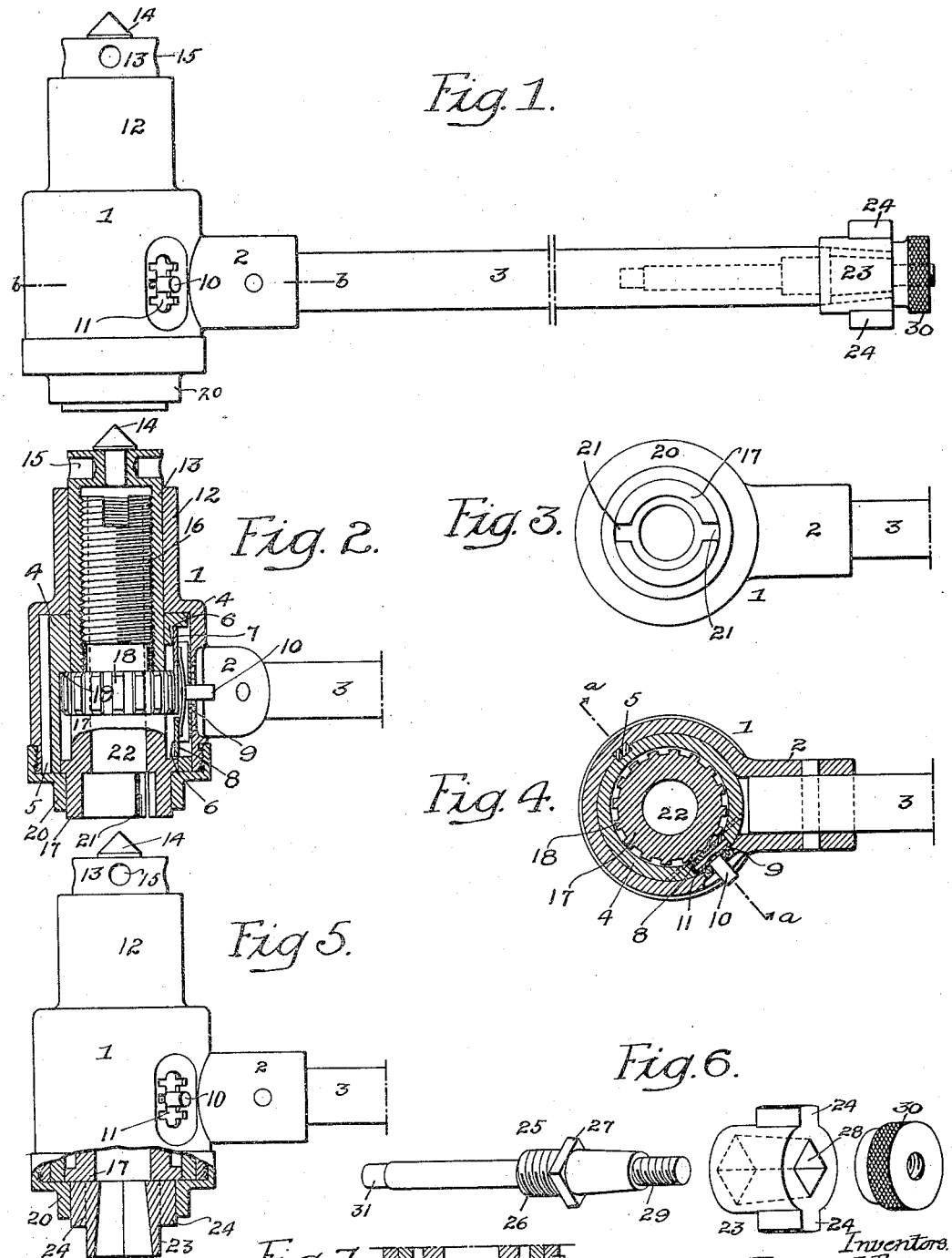

THOMAS J. FEGLEY AND GEORGE O. LEOPOLD, OF PHILADELPHIA, PENNSYLVANIA, ASSIGNORS TO NORTH BRO'S. M'F'G. CO., OF PHILADELPHIA, PENNSYLVANIA, A CORPORATION OF PENNSYLVANIA.

RATCHET-DRILL.

1,163,072.  Specification of Letters Patent. Patented Dec. 7, 1915.

Application filed December 9, 1913. Serial No. 805,578.

*To all whom it may concern:*

Be it known that we, THOMAS J. FEGLEY and GEORGE O. LEOPOLD, citizens of the United States, residing in Philadelphia, county of Philadelphia, State of Pennsylvania, have invented certain Improvements in Ratchet-Drills, of which the following is a specification.

Our invention relates to certain improvements in ratchet drills.

One object of our invention is to construct a ratchet drill which will be substantial in construction and which will permit the spindle carrying the drill to ratchet to the right or to the left; the spindle being locked in the mid-position.

A further object of the invention is to provide a drill which is arranged to receive the tapered cylindrical shank of a bit, but which can be used in connection with a square shank bit without dismantling the mechanism.

A still further object of the invention is to provide means for carrying the chuck piece for the square shank bit.

In the accompanying drawing:—Figure 1, is a side view of our improved ratchet drill; Fig. 2, is a longitudinal sectional view on the line *a—a*, Fig. 4; Fig. 3, is an inverted plan view; Fig. 4, is a transverse sectional view on the line *b—b*, Fig. 1; Fig. 5, is a side view, partly in section, showing the square shank chuck piece applied to the drill; Fig. 6, is a detached perspective view showing the chuck piece and the means for securing it to the handle of the drill; and Fig. 7, is a view showing the chuck piece secured to the drill by a screw.

Referring to the drawing, 1 is the casing having a projection 2 in which the handle 3 is secured. This handle can be of any length desired.

4 is a shell mounted in the casing and secured thereto by a key 5. This shell has a longitudinal slot for the reception of the pawls and is slotted transversely at 6, 6 for the pivot members of the pawls 7 and 8.

9 is a shifter spring which bears upon the pawls, and the pin 10 attached to this spring projects through a slot 11 in the casing 1.

The casing 1 has an extension 12 in which is mounted a sliding feed sleeve 13 having a center pin 14 and having radiating holes 15 into which a tool can be inserted to turn this feed sleeve. The feed sleeve has an internal screw thread adapted to the threaded stem 16 of the chuck 17. This chuck has its bearings also in the shell 4. On the chuck is an annular row of ratchet teeth 18 with which the pawls 7 and 8 engage. The chuck is held between a shoulder 19 on the shell 4 and a cap 20 secured to the casing 1. The cap has an extension acting as a guide for the projecting portion of the chuck which is slotted, as at 21, for the purpose described hereinafter. The chuck has a tapered opening 22 into which fits the tapered shank of a drill bit.

In order that a square shank bit may be used, as well as a round shank bit, we provide a chuck piece 23, which has lugs 24, as illustrated in Fig. 6, which enter the slots 21 in the chuck 17, as illustrated in Fig. 5, so that the said chuck piece will turn with the chuck and is held in position in the chuck by the pressure of the tool against the bit. This piece is detachable and, in order that it may be carried at all times by the tool, we secure the chuck piece to a shaped pin 25 which has a screw threaded portion 26 adapted to an opening in the end of the handle 3, as illustrated in Fig. 1. This pin has a squared portion 27 adapted to a squared opening 28 in the chuck piece 23. The end of the pin is threaded, as at 29, to receive a nut 30 which confines the chuck piece to the pin. The end 31 of the pin is of such a size as to fit the openings 15 in the sleeve 13 so that, upon removing the pin and applying it to the sleeve, the sleeve can be turned as the drill cuts into the work. In some instances we may secure the chuck piece 23 in the chuck 17 by a screw 32, Fig. 7. The chuck piece can be readily released by turning the screw.

By the above construction it will be seen that we make a very substantial ratchet drill, which is simple in construction and which will normally receive the ordinary tapered shank drill bit and which need not be dismantled to apply a square shank drill bit, as the chuck piece is simply attached to the chuck when the square shank bit is applied and is held in position by the pressure of the tool against the work. For convenience, this chuck piece is carried by the handle of the tool so that it will be always ready for use.

We claim:—

The combination in a ratchet drill, of a casing having an extension at one end and a detachable cap at the opposite end, said casing having an internal shoulder; a shell located within the body of the casing between the shoulder and the cap and also having an internal shoulder; a feed sleeve located in the extension of the casing; a chuck held between the internal shoulder of the shell and the cap, said chuck having a ratchet wheel; pawls carried by the shell; and means whereby either of said pawls may be shifted into engagement with the ratchet wheel.

In testimony whereof, we have signed our names to this specification in the presence of two subscribing witnesses.

THOMAS J. FEGLEY.
GEORGE O. LEOPOLD.

Witnesses:
Jos. H. Klein,
Wm. A. Barr.

Copies of this patent may be obtained for five cents each, by addressing the "Commissioner of Patents, Washington, D. C."